(12) United States Patent
Cirot et al.

(10) Patent No.: US 7,777,432 B2
(45) Date of Patent: Aug. 17, 2010

(54) HORIZONTAL AND VERTICAL DYNAMIC CORRECTION IN CRT MONITORS

(75) Inventors: Eric Yves Serge Cirot, Singapore (SG); Sze Kwang Tan, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 1111 days.

(21) Appl. No.: 10/529,974

(22) PCT Filed: Sep. 30, 2002

(86) PCT No.: PCT/SG02/00224

§ 371 (c)(1),
(2), (4) Date: Jun. 2, 2006

(87) PCT Pub. No.: WO2004/039062

PCT Pub. Date: May 6, 2004

(65) Prior Publication Data

US 2006/0244399 A1    Nov. 2, 2006

(51) Int. Cl.
*H01J 29/56* (2006.01)
(52) U.S. Cl. .................. 315/370; 315/371; 315/382; 348/E9.021; 327/355; 327/361

(58) Field of Classification Search .................. 315/368, 315/18, 368.21, 368.23, 370, 371, 382, 382.1, 315/411; 348/E3.043, E3.048, E9.021; 327/334, 327/355, 361
See application file for complete search history.

(56) References Cited

U.S. PATENT DOCUMENTS

| | | | | |
|---|---|---|---|---|
| 5,428,270 A | * | 6/1995 | Infante | 315/382 |
| 6,088,015 A | * | 7/2000 | Kato | 345/440.1 |
| 6,215,258 B1 | | 4/2001 | Sakata et al. | 315/382 |
| 6,246,445 B1 | | 6/2001 | Kwon | 348/687 |
| 7,102,302 B2 | * | 9/2006 | George | 315/368.21 |
| 7,161,411 B2 | * | 1/2007 | Cirot et al. | 327/541 |

FOREIGN PATENT DOCUMENTS

EP   0 821 520 A2   1/1998
JP   2001-268386   9/2001

* cited by examiner

*Primary Examiner*—Haissa Philogene
(74) *Attorney, Agent, or Firm*—Lisa K. Jorgenson; David F. Carlson

(57) ABSTRACT

A device and method for generation of a dynamic focus correction signal for use with a CRT that includes an analog scanning processor for generating a dynamic focus correction signal that is proportional to $Kx^2+(1-K)x^4$, where x is the distance from a mid point of a viewing surface of the CRT, and K is a real number in the range 0.00 to 1.00. Embodiments of the invention find particular use in CRTs having generally flatter, squarer configurations.

25 Claims, 3 Drawing Sheets

HORIZONTAL AND VERTICAL DYNAMIC CORRECTION IN CRT MONITORS

BACKGROUND OF THE INVENTION

1. Field of the Invention

The present invention relates to a scanning processor for use with Cathode Ray Tubes (CRTs) as used in television and computer monitor displays and, more particularly, to CRTs having display surfaces with a profile that is more flat and square than existing CRTs.

2. Description of the Related Art

FIG. 1 shows the effect of the curvature of the CRT on the distance between the inner phosphor surface of the CRT and the electron gun. If the display surface 100 of the CRT were configured to follow the circumference of an imaginary circle 140 centered at the output of the electron gun 110, then each point on the inner surface of the display surface 100 would be equidistant from the electron gun 110.

However, in general, the display surfaces of CRTs are made to be as flat as possible, within the manufacturing constraints of the vacuum bulb. FIG. 1 shows a typical configuration of a display surface 100 superimposed on the imaginary circle 140.

It can be seen from FIG. 1 that the distance between a point at the center of the display surface is significantly closer—as shown by a first arrow 120—to the electron gun 110, than a point at an outer edge of the display surface. The greater distance is represented by a second arrow 130.

The difference in distance between the different points of the display surface poses problems in beam brightness and focusing. Points closer to the gun require a different focal length than to points further away. Closer points will also tend to be brighter than further away points.

FIG. 2 shows an enlarged view of the display surface of a CRT affected by the described focusing problems. The display surface should be displaying a single horizontal line of uniform thickness. However, due to the differing focal length across the horizontal axis of the display screen, the image of the line tends to taper at the extreme edges of the display surface. The effect is shown in a deliberately exaggerated fashion for clarity, but particularly on larger screens it is noticeable to the human eye.

These problems are exacerbated by recent developments in CRT technology which have yielded so-called minineck tubes having a reduced depth i.e., distance between display surface and electron gun.

To overcome problems associated with the increasing flatness and squareness of CRTs, manufacturers of televisions and monitors attempt to configure their products to dynamically adapt the focusing and brightness for different points on the display surface. Prior art solutions include supplying focus and brightness adjust circuits arranged to accept one or more signals configured to alter focus and brightness characteristics of the displayed image.

However, prior solutions are limited in the amount of correction that they are able to supply. Prior solutions are limited to being able to supply parabolic correction signals, i.e., signals characterized by the mathematical expression $x^2$. The correction signals are applied to bias or modulate the focusing and/or brightness signals. Such correction signals have been acceptable with older types of vacuum tubes, but are not found to adequately remedy the problem with the flatter and squarer tubes now becoming available.

A typical graph showing the dynamic focus voltage required for a particular point at a distance x from the screen center is shown in FIG. 3 for both horizontal 200 and vertical 210 deflections. In the vertical direction, the particular curve 210 shown in FIG. 3 is defined by the relationship:

$$V_{dyn\_focus\_v} \propto x^2$$

In the horizontal direction, the relationship is different, as the tube is not symmetrical in the horizontal and vertical directions. The relationship defining horizontal dynamic focus is given by:

$$V_{dyn\_focus\_h} \propto x^{2.6}$$

These figures are exemplary only, and different tubes from different manufacturers can have dynamic focus voltages defined as:

$$V_{dyn\_focus} \propto x^n$$

where n is generally in the range 2-2.6, although further improvements in tube design may lead to progressively higher values of n.

Prior art systems for dynamic focus correction are limited to correcting for the case where the correction voltage is proportional to the square of the distance from the center point. Since most tubes have a different relationship as defined previously, this approximation results in poor focus and brightness performance, particularly at the extremities of the screen, where the value of x is larger and so exacerbates the problem. Also, since different tubes have different characteristics, each type of tube must be individually optimized, leading to increased design work for each end product.

BRIEF SUMMARY OF THE INVENTION

The disclosed embodiments of the present invention provide an analog scanning processor for generation of a dynamic focus correction signal for use with a CRT, the dynamic focus correction signal characterized in that it is proportional to $Kx^2+(1-K)x^4$, where x is the distance from a mid point of a viewing surface of the CRT, and K is a real number in the range 0.00 to 1.00.

Preferably, the dynamic correction signal is a horizontal or vertical dynamic focus correction signal.

Preferably, the processor is arranged to generate a plurality of dynamic correction signals.

Preferably, the processor includes means for generating a dynamic brightness correction signal.

Preferably, the dynamic correction signal for use in a horizontal direction is different to the dynamic correction signal for use In a vertical direction.

Preferably, the processor includes a shape adjustment circuit arranged to receive as inputs a sawtooth waveform at the deflection frequency; a shape control signal; and an amplitude control signal, the shape adjustment circuit is arranged to produce a signal which approximates closely to the sawtooth input waveform raised to a power n, where n is a real number. Ideally, the value of n is in the range 2.00 to 4.00.

In accordance with another embodiment of the invention, a CRT monitor is provided that includes an analog scanning processor for generation of a dynamic correction signal for use with a CRT monitor. The analog scanning processor is configured to generate a correction signal that is proportional to $Kx^2+(1-K)x^4$, where x is the distance from a mid point of a viewing surface of the CRT, and K is a real number in the range 0.00 to 1.00.

In accordance with another embodiment of the invention, generation of the correction signal includes use of a shape adjustment circuit that receives as inputs a sawtooth waveform, preferably parabolic, as well as a shape control signal and an amplitude control signal, and wherein two output signals are produced, $Out_1$ and $Out_2$ according to the following:

$$Out_1 = H_{amp} \times H_{phasesize}^2 \times [H_{shape} + (1-H_{shape}) \times H_{phasesize}^2] V_{amp} \times V_{sawtooth}^2$$

$$Out_2 = V_{bright} \times V_{sawtooth}^2$$

where:

$H_{sawtooth}$ is a sawtooth waveform at the horizontal deflection frequency (normalized and centered);

$V_{sawtooth}$ is a sawtooth waveform at the vertical deflection frequency including vertical size and position information;

$V_{bright}$ is an amplitude adjustment for the dynamic brightness control;

$V_{amp}$ is the vertical amplitude control;

$H_{amp}$ is the horizontal amplitude control;

$H_{phase}$ is the horizontal phase control;

$H_{shape}$ is the horizontal shape control;

$H_{size}$ is the horizontal size control; and $H_{phasesize} = (H_{sawtooth} + H_{phase}) \times (1 + H_{size})$.

A method of generating a dynamic correction signal for a CRT monitor is also provided, the method including generating the correction signal that is proportional to $Kx^2 + (1-K)x^4$, where x is the distance from a mid point of a viewing surface of the CRT, and K is a real number in the range 0.00 to 1.00.

BRIEF DESCRIPTION OF THE DRAWINGS

Representative embodiments of the present invention are hereinafter described, by way of example only, with reference to the appended drawings in which.

DETAILED DESCRIPTION OF THE PREFERRED EMBODIMENTS

In the following description, the dynamic correction circuit will be described as it applies to dynamic focus correction. However, one skilled in the art will appreciate that similar techniques may be applied to dynamically adjust the brightness.

Figure 1:
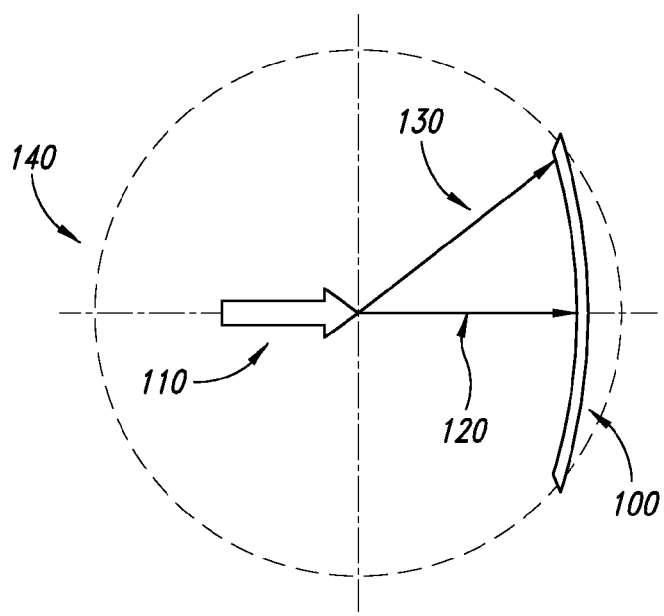
FIG. 1 shows the effect of curvature of a CRT on beam distances.
Figure 2:
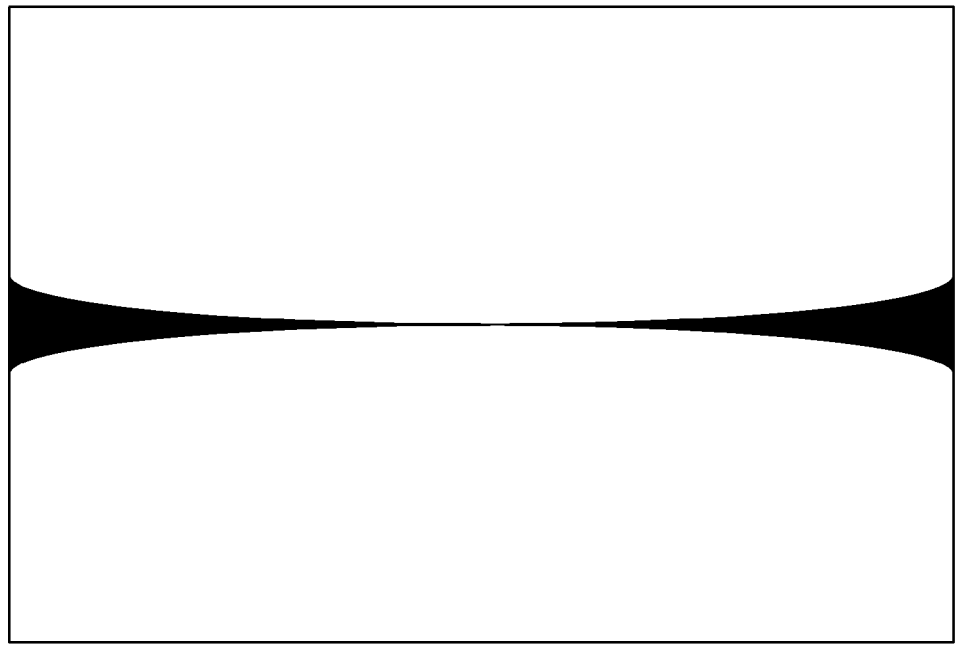
FIG. 2 shows an exaggerated view of the effect of a variation of focus distance on the presentation of a single horizontal line.
Figure 3:
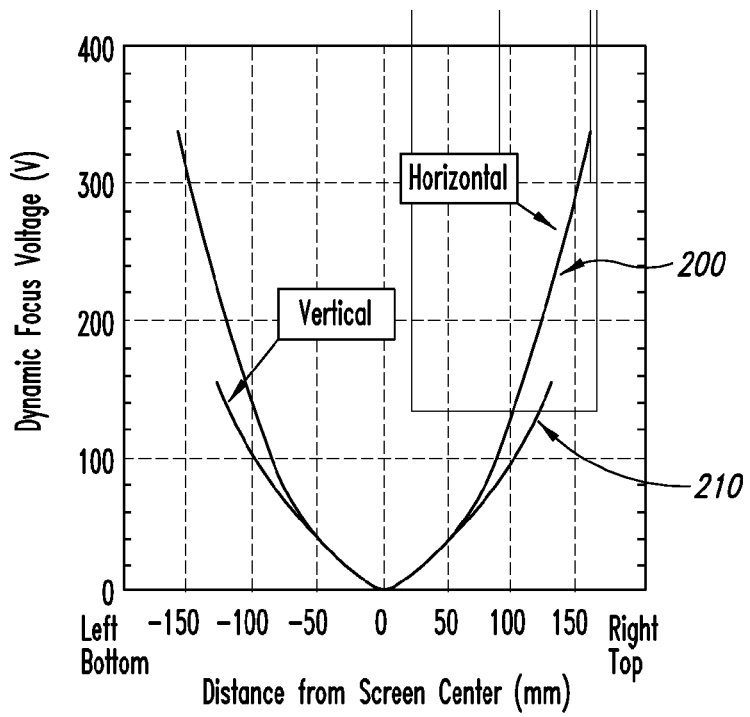
FIG. 3 shows the dynamic focus voltage required for horizontal and vertical deflections in a typical CRT.
Figure 4:
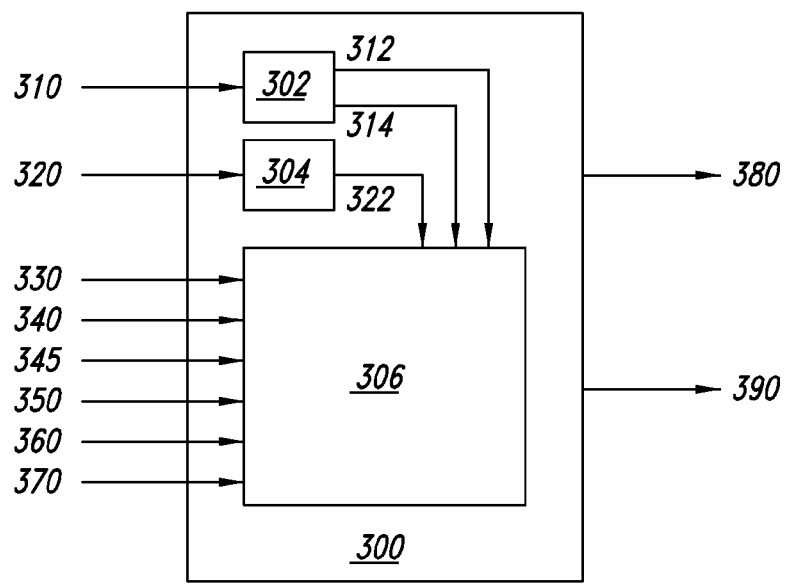
FIG. 4 shows a top level view of a dynamic correction circuit.

FIG. 4 shows a top level view of the dynamic correction circuit 300. In order to dynamically alter the focus, a circuit 306 is provided which varies the horizontal and vertical deflection waveforms and applies an AC voltage to the focus electrode.

Dynamic brightness adjustments may be performed by modulating the ABL voltage which is normally applied at the video pre-amplification stage.

For horizontal dynamic focus adjustments, the circuit 300 includes a Phase Locked Loop (PLL) 302 that is locked to an incoming horizontal sync input 310. The PLL fixes the phase and also coarse tunes the internal Automatic Gain Circuit (AGC) which generates the horizontal dynamic focus correction signal. The output signals from the PLL to circuit 306 are Frequency 312 and gross phase 314.

For vertical dynamic focus adjustments, the circuit includes an AGC 304 which is locked to a vertical sync input 320. The output 322 from the AGC circuit is a squared sawtooth waveform $V_{sawtooth}^2$.

Other inputs are provided to the circuit 306 which are used to fine tune the output signals. The other input signals are:

Horizontal amplitude control ($H_{amp}$) 330
Vertical amplitude control ($V_{bright}$) 340
Vertical amplitude control ($V_{amp}$) 345
Horizontal phase control ($H_{phase}$) 350
Horizontal size control ($H_{size}$) 360
Horizontal shape control ($H_{shape}$) 370

The circuit 300 has two outputs 380, 390. The first output 380 is a composite output for horizontal and vertical focus correction. The second output 390 is the vertical dynamic brightness control signal. The outputs may be represented:

$$Out_1(380) = H_{amp} \times H_{phasesize}^2 \times [H_{shape} + (1-H_{shape}) \times H_{phasesize}^2] V_{amp} \times V_{sawtooth}^2$$

$$Out_2(390) = V_{bright} \times V_{sawtooth}^2$$

where:

$H_{sawtooth}$ is a sawtooth waveform at the horizontal deflection frequency (normalized and centered);

$V_{sawtooth}$ is a sawtooth waveform at the vertical deflection frequency including vertical size and position information;

$V_{bright}$ is an amplitude adjustment for the dynamic brightness control;

$H_{phasesize} = (H_{sawtooth} + H_{phase}) \times (1 + H_{size})$.

Figure 5:
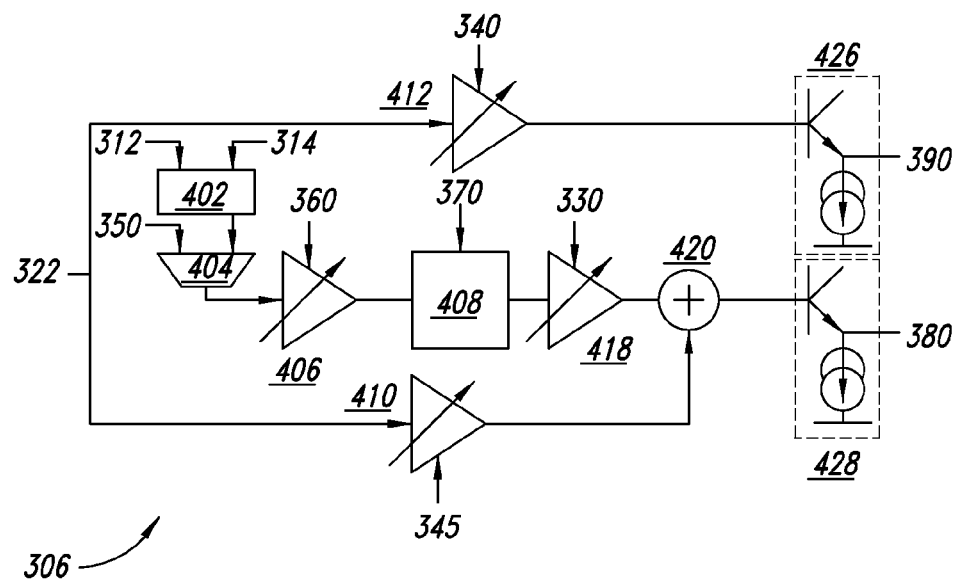
FIG. 5 shows a detailed view of a dynamic focus system.

FIG. 5 shows the internal structure of shape adjustment circuit 306. The primary input 322 to the circuit is the output from the AGC circuit 304. The input 322 is a squared parabolic waveform. The signal 322 is split into two components, which are separately processed to produce the two output signals 380, 390.

In the first branch, the input signal 322 is applied to a variable gain amplifier 412. The gain of this amplifier is adjustable by signal 340 which is a Vertical, amplitude control signal. This signal is provided to allow user adjustment of the vertical control signal 390, and it may be adjusted through an on screen menu system.

The output of amplifier 412 passes to amplifier arrangement 426 which includes a transistor and a current source. The output signal 390 is derived from the emitter of the transistor.

In the second branch, the input signal 322 is applied to a variable gain amplifier 410, where the gain is adjustable by signal 345, which allows user adjustment of the composite adjustment signal 380. The output of amplifier 410 is applied to a summer circuit 420. The other input to the summer circuit 420 is derived from a number of input signals.

Signals 312 and 314, which are output from the PLL 302 and represent frequency and gross phase information respectively, are applied to the AGC circuit 402. Circuit 402 acts to generate a ramp signal at the frequency determined by input 312. The ramp signal is applied to phase circuit 404. Circuit 404 receives a second input 350 which is a horizontal phase control signal, allowing separate adjustment of the phase of the output signal 380.

The output of circuit 404 is applied to a variable gain amplifier 406, whose gain is adjustable by signal 360. Signal 360 is a horizontal size control signal, which is provided to allow a user to control the horizontal size of an image displayed on the CRT. Again, this option may be accessed via an on-screen menu system.

The output of amplifier 406 is applied to circuit 408, which also has as an input 370 for controlling the shape of the output signal 380. The operation of circuit 408 is described later with reference to FIG. 6. The output of circuit 408 is a shape-adjusted version of the input to circuit 408, the shape adjustment being performed in accordance with the value of the shape adjustment signal 370. The output of circuit 408 is applied to variable gain amplifier 418, whose gain is adjustable in accordance with the signal 330 which controls the amplitude of the signal presented to the summer circuit 420.

The output of the summer circuit 420 is applied to the output amplifier arrangement 428 which includes a transistor and a current source. The composite output signal 380 is derived from the emitter of the transistor.

Figure 6:
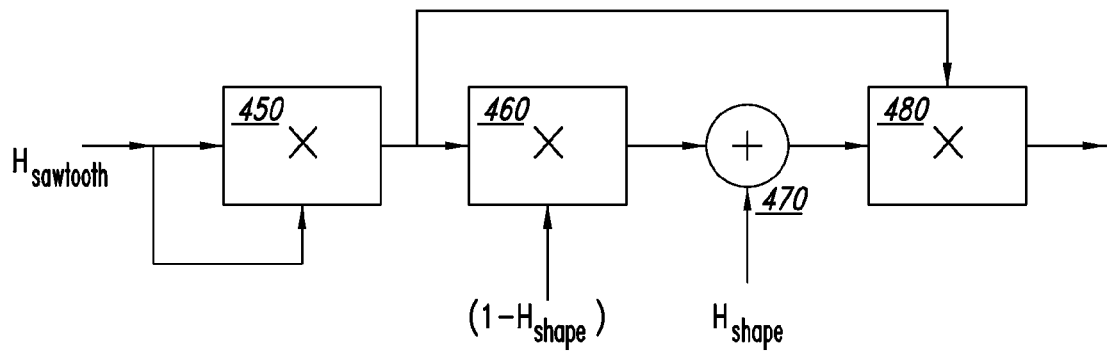
FIG. 6 shows a detailed view of the shape adjustment circuit.

FIG. 6 shows the internal structure of shape adjustment circuit 408. The purpose of this circuit is to alter the shape of its input waveform, $H_{sawtooth}$, so that it more closely resembles the waveform required for dynamic focus correction, i.e., it is altered to resemble a waveform characterized as $X^n$, where n is a real, non-integer value, generally in the range 2-4.

Analogue implementation of circuits that can raise an incoming signal to an arbitrary real (non-integer) power are complex and can generally only be created for a specific value of n. In order to provide a more generic solution that may be tailored by a designer to operate with a specified CRT, it is desirable to provide a correction circuit which may be configured to assume a desired value of n.

However, such circuits are complex, and it is found that a good approximation of $x^n$ is provided by the following mathematical expression:

$$x^n \approx K_1 x^2 + K_2 x^4$$

where $K_1 = H_{shape}$ and $K_2 = (1 - H_{shape}) = (1 - K_1)$

Typical current CRTs require a value of n=2.6. Of course, the above expression is only ever 100% accurate for the case where n is equal to 2 or 4, but the extent of the inaccuracy is never more than ±1.5% in the range n:2→4.

Compared to the prior art approach of using a parabolic waveform (n=2), where a more appropriate correction signal would set n=2.6, the error can be as much as 9.5% over the same range. Therefore, embodiments of the present invention offer a much improved performance.

FIG. 6 shows the internal operation of shape adjustment block 408. The input to multiplication block is $H_{sawtooth}$, which is squared by being multiplied by itself. The resultant squared signal is split into two paths, with the signal on the first path being further multiplied by $(1-H_{shape})$ in multiplication block 460, before being added to $H_{shape}$ 370 in adder 470. The result of the addition is then multiplied by the signal on the other path in multiplier 480. The result of this operation may be expressed mathematically as:

$$H_{amp} \cdot [(H_{shape}) H_{sawtooth}^2 + (1-H_{shape}) H_{sawtooth}^4]$$

This can be seen to have the form required i.e., $KX^2 + (1-K)x^4$.

For a typical CRT having n=2.6, $H_{shape}$ may be set to 0.59 to achieve the desired result. Of course, different CRT configurations will require different values of n, and $H_{shape}$ may be adjusted accordingly.

The signal provided for the vertical dynamic focus control is a parabolic control signal. This is found to be adequate in most cases, as the vertical dimension is shorter than the horizontal dimension, reducing the extent of the problem. However, if necessary, a similar approach to vertical dynamic focus as is used for horizontal dynamic focus may be adopted.

Figure 7:
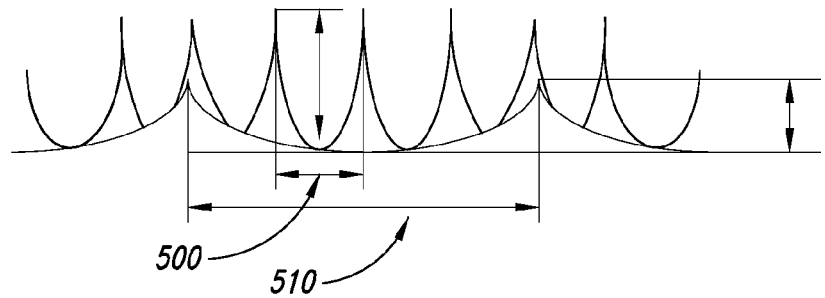
FIG. 7 shows a composite horizontal and vertical dynamic focusing signal.

The vertical dynamic focus signal is superimposed on the horizontal dynamic focus signal to yield the composite output signal 380. The form of this waveform is shown in FIG. 7. The horizontal component of the signal is designated 500, and the vertical component is designated 510. The composite signal is applied to the focus electrode of the CRT.

The dynamic brightness correction signal 390 may be applied to the video preamplification stage as has been described already.

Use of embodiments of the invention allow a TV or monitor manufacturer to offer users an opportunity to further customize the setup of their equipment through use of on-screen menus permitting focus and/or brightness to be altered.

The present invention includes any novel feature or combination of features disclosed herein either explicitly or any generalization thereof regardless of whether or not it relates to the claimed invention or mitigates any or all of the problems addressed.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A device for generation of a correction signal for use with a CRT, comprising:
    an analog scanning processor configured to generate a correction signal that is proportional to $Kx^2 + (1-K)x^4$, where x is the distance from a mid point of a viewing surface of the CRT, and K is a real number in the range 0.00 to 1.00.

2. The device of claim 1 wherein the dynamic correction signal is a horizontal focus correction signal.

3. The device of claim 1 wherein the dynamic correction signal is a vertical focus correction signal.

4. The device of claim 1 wherein the processor is arranged to generate a plurality of correction signals.

5. The device of claim 1, comprising means for generating a dynamic brightness correction signal.

6. The device of claim 5 wherein the dynamic correction signal for use in a horizontal direction is different than the dynamic correction signal for use in a vertical direction.

7. The device of claim 1 wherein the processor includes a shape adjustment circuit arranged to receive as inputs:
    a sawtooth waveform at the deflection frequency;
    a shape control signal; and
    an amplitude control signal,
wherein the shape adjustment circuit is arranged to produce a signal that approximates closely to the sawtooth input waveform raised to a power n, where n is a real number.

8. The device of claim 7 wherein the value of n is in the range 2.00 to 4.00.

9. The device of claim 1 wherein the processor includes a first output signal ($Out_3$) and a second output signal ($Out_2$) generated in accordance with the following:

$$Out_1 = H_{amp} \times H_{phasesize}^2 \times [H_{shape} + (1-H_{shape}) \times H_{phasesize}^2] V_{amp} \times V_{sawtooth}^2$$

$$Out_2 = V_{bright} \times V_{sawtooth}^2$$

where:
    $H_{sawtooth}$ is a sawtooth waveform at the horizontal deflection frequency (normalized and centered);

$V_{sawtooth}$ is a sawtooth waveform at the vertical deflection frequency including vertical size and position information;

$V_{bright}$ is an amplitude adjustment for the dynamic brightness control;

$V_{amp}$ is the vertical amplitude control;

$H_{amp}$ is the horizontal amplitude control;

$H_{shape}$ is the horizontal shape control;

$H_{phase}$ is the horizontal phase control;

$H_{size}$ is the horizontal size control; and $H_{phasesize} = (H_{sawtooth} + H_{phase}) \times (1 + H_{size})$.

10. A CRT monitor having an electron gun, comprising:
an analog scanning processor for generation of a dynamic correction signal for use with the CRT monitor, the dynamic focus correction signal generated to be proportional to $Kx^2 + (1-K)x^4$, where x is the distance from a mid point of a viewing surface of the CRT monitor and the electron gun, and K is a real number in the range 0.00 to 1.00.

11. The CRT monitor of claim 10 wherein the processor includes a shape adjustment circuit having a first input coupled to the output of an automatic gain control circuit configured to generate a squared parabolic waveform signal, the shape adjustment circuit configured to process the squared parabolic waveform to produce two output signals.

12. The CRT monitor of claim 11 wherein the dynamic correction signal is a horizontal dynamic focus correction signal.

13. The CRT monitor of claim 10 wherein the dynamic correction signal is a vertical dynamic focus correction signal.

14. The CRT monitor of claim 10 wherein the processor is arranged to generate a plurality of dynamic correction signals.

15. The CRT monitor of claim 10, further comprising means for generating a dynamic brightness correction signal.

16. The CRT monitor of claim 15 wherein the dynamic correction signal for use in a horizontal direction is different than the dynamic correction signal for use in a vertical direction.

17. The CRT monitor of claim 12 wherein the shape adjustment circuit is configured to receive as inputs a shape control signal and an amplitude control signal and to produce a signal that approximates closely to the sawtooth input waveform raised to a power N, where N is a real number.

18. The CRT monitor of claim 17 wherein the value of N is in the range of 2.00-4.00.

19. The CRT monitor of claim 11 wherein the shape adjustment circuit output signals comprise a first output signal ($Out_s$) and a second output signal ($Out_2$) that are generated in accordance with the following:

$$Out_1 = H_{amp} \times H_{phasesize}^2 \times [H_{shape} + (1-H_{shape}) \times H_{phasesize}^2] V_{amp} \times V_{sawtooth}^2$$

$$Out_2 = V_{bright} \times V_{sawtooth}^2$$

where:

$H_{sawtooth}$ is a sawtooth waveform at the horizontal deflection frequency (normalized and centered);

$V_{sawtooth}$ is a sawtooth waveform at the vertical deflection frequency including vertical size and position information;

$V_{bright}$ is an amplitude adjustment for the dynamic brightness control;

$V_{amp}$ is the vertical amplitude control;

$H_{amp}$ is the horizontal amplitude control;

$H_{shape}$ is the horizontal shape control;

$H_{phase}$ is the horizontal phase control;

$H_{size}$ is the horizontal size control; and $H_{phasesize} = (H_{sawtooth} + H_{phase}) \times (1 + H_{size})$.

20. A method of dynamic correction in a CRT monitor having an electron gun, the method comprising:
generating an output from the electron gun; and
generating a correction signal for the output of the electron gun that is proportional to $Kx^2 + (1-K)x^4$, where x is the distance from a mid point of a viewing surface of the CRT monitor and the electron gun, and K is a real number in the range 0.00 to 1.00.

21. The method of claim 20 wherein generating the correction signal comprises receiving on an input of a shape adjustment circuit an output from an automatic gain control circuit that is a squared parabolic waveform, and also receiving a shape control signal and an amplitude control signal and producing a signal that approximates closely to a sawtooth input waveform raised to a power N, where N is a real number.

22. The method of claim 21 where N is in the range of 2.00-4.00.

23. The method of claim 21 wherein the squared parabolic waveform is split into two components and separately processed to produce a first output ($Out_1$) and a second output ($Out_2$) that is generated in accordance with the following:

$$Out_1 = H_{amp} \times H_{phasesize}^2 \times [H_{shape} + (1-H_{shape}) \times H_{phasesize}^2] V_{amp} \times V_{sawtooth}^2$$

$$Out_2 = V_{bright} \times V_{sawtooth}^2$$

where:

$H_{sawtooth}$ is a sawtooth waveform at the horizontal deflection frequency (normalized and centered);

$V_{sawtooth}$ is a sawtooth waveform at the vertical deflection frequency including vertical size and position information;

$V_{bright}$ is an amplitude adjustment for the dynamic brightness control;

$V_{amp}$ is the vertical amplitude control;

$H_{amp}$ is the horizontal amplitude control;

$H_{shape}$ is the horizontal shape control;

$H_{phase}$ is the horizontal phase control;

$H_{size}$ is the horizontal size control; and $H_{phasesize} = (H_{sawtooth} + H_{phase}) \times (1 + H_{size})$.

24. The method of claim 20, further comprising generating a dynamic brightness correction signal.

25. The method of claim 24 wherein generating the correction signal comprises generating a dynamic correction signal for use in a horizontal direction and a second dynamic correction signal for use in a vertical direction that is different than the dynamic correction signal for use in a horizontal direction.

* * * * *